(12) United States Patent
Smetana

(10) Patent No.: US 8,261,897 B2
(45) Date of Patent: Sep. 11, 2012

(54) FREEWHEEL CLUTCH

(75) Inventor: Tomas Smetana, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 424 days.

(21) Appl. No.: 12/301,281

(22) PCT Filed: May 14, 2007

(86) PCT No.: PCT/EP2007/054625
§ 371 (c)(1),
(2), (4) Date: Dec. 10, 2008

(87) PCT Pub. No.: WO2007/135005
PCT Pub. Date: Nov. 29, 2007

(65) Prior Publication Data
US 2009/0200135 A1   Aug. 13, 2009

(30) Foreign Application Priority Data

May 19, 2006   (DE) ........................ 10 2006 023 564

(51) Int. Cl.
*F16D 41/07*   (2006.01)
(52) U.S. Cl. .................... 192/45.1; 192/110 B; 384/569
(58) Field of Classification Search ................. 192/45.1, 192/110 B; 384/564, 569
See application file for complete search history.

(56) References Cited

U.S. PATENT DOCUMENTS

| | | | | |
|---|---|---|---|---|
| 2,677,448 | A * | 5/1954 | Gillespie | 192/45.1 |
| 6,435,326 | B2 * | 8/2002 | Shirataki et al. | 192/45.1 |
| 6,863,164 | B2 | 3/2005 | Yamamoto | |
| 2007/0220875 | A1 * | 9/2007 | Akamatsu et al. | 60/345 |

FOREIGN PATENT DOCUMENTS

| | | |
|---|---|---|
| EP | 02 91 550 Y | 11/1988 |
| EP | 0 611 898 A | 8/1994 |
| FR | 2 747 442 A | 10/1997 |
| WO | 2006/070798 XE | 7/2006 |

\* cited by examiner

*Primary Examiner* — David D Le
*Assistant Examiner* — Jacob S Scott
(74) *Attorney, Agent, or Firm* — Lucas & Mercanti, LLP; Klaus P. Stoffel

(57) ABSTRACT

A freewheel clutch that has sprags, which are located between an inner locking track and an outer locking track and two sliding discs which each feature one inner axis adjacent to the inner locking track, one outer axis adjacent to the outer locking track as well as one middle section which connects the axes, and has an axial inwardly directed bending. The bending extends from the outer axis to the inner axis and preferably features a maximum embossing depth which is lower than the wall thickness of the middle section.

9 Claims, 3 Drawing Sheets ns is hereby claimed and both applications are incorporated by reference herein.

FREEWHEEL CLUTCH

This application is a 371 of PCT/EP2007/054625 filed May 14, 2007, which in turn claims the priority of DE 10 2006 023 564.9 filed May 19, 2006, the priority of both applications is hereby claimed and both applications are incorporated by reference herein.

FIELD OF THE INVENTION

The invention relates to a freewheel clutch which comprises clamping bodies arranged between an inner clamping track and an outer clamping track and sliding disks which serve for the radial mounting and are likewise arranged in the annular space between the inner clamping track and the outer clamping track.

BACKGROUND OF THE INVENTION

A freewheel clutch according to the preamble of claim 1 is known, for example, from U.S. Pat. No. 6,863,164 B2. This freewheel clutch has a sliding disk having a leg bearing against the inner clamping track, a leg bearing against the outer clamping track and a middle section connecting the legs. Formed inside the middle section is a bend which is directed axially inward and which strengthens one of the legs of the sliding disk. This is intended to avoid elastic deformations of the sliding disk during operation of the freewheel clutch.

OBJECT OF THE INVENTION

The object of the invention is to specify a freewheel clutch having a sliding disk which is distinguished by an especially favorable relationship between axial space requirement and radial loading capacity.

SUMMARY OF THE INVENTION

This object is achieved according to the invention by a freewheel clutch having the features of claim 1. This freewheel clutch has a plurality of clamping bodies and two sliding disks having a respective bend directed inward, i.e. facing the clamping bodies. The bend extends from the outer leg, bearing against an outer clamping track, of the sliding disk up to the inner leg, bearing against an inner clamping track, of the sliding disk. In other words: the middle section, connecting the legs, of the sliding disk is designed as a bend overall. The expression "bend" refers in this case to a completely curved shape as well as to a cross-sectional shape having segments tapering in an arrow shape in the direction of the clamping bodies. A cross-sectional shape of the middle section of the sliding disk with a combination of at least one segment straight per se and at least one curved segment is also subsumed under the expression "bend".

The axial distance between that surface of the sliding disk which is furthest on the outside, i.e. remote from the clamping bodies, and that outer surface of the middle section which is bent furthest inward is designated as embossment depth. The latter is preferably less than the wall thickness of the middle section. There is therefore at least one radial line which intersects the inner leg and the outer leg of the sliding disk and runs between the legs completely within the middle section. The middle section of the sliding disk is thus distinguished by a small axial space requirement. At the same time, elastic resilience of the sliding disk in the radial direction is provided for by the bend of the middle section, said bend extending over the entire height measured in the radial direction. Even high radial loads acting on the freewheel clutch lead at most to slight plastic deformation of the sliding disk. In addition, the elastically resilient design of the entire middle section of the sliding disk has the advantage that, during compression of the sliding disk in the radial direction, the angular position of the inner leg and of the outer leg changes at most to a slight degree. Also during radial loading of the sliding disk, their legs still bear fully against the respective clamping track to the greatest possible extent. The contact pressure, which is thus kept low, between the sliding disk and the clamping tracks has in particular a positive effect with regard to the wear behavior.

The middle section, arranged between the inner leg and the outer leg, of the sliding disk has regions of different inclination relative to a radial line running orthogonally to the clamping tracks. The inclination is preferably not more than 30° in any region of the middle section, and in particular is not more than 20°, for example at most 10°. The middle section of the sliding disk therefore has an only slightly increased axial space requirement compared with a conventional sliding disk having a middle section which is flat throughout. At the same time, rigidity and plastic collapse loads of the sliding disk are substantially increased. The maximum axial offset between that region of the middle section which is furthest on the outside, i.e. remote from the clamping bodies, and that region of the middle section which is furthest on the inside is designated in short as embossment depth, and is preferably not more than half the wall thickness of the middle section. In a preferred configuration, the entire extent of the middle section in the axial direction of the freewheel clutch is less than half the axial overall width of the sliding disk.

The middle section of the sliding disk is preferably composed of precisely two segments inclined in different directions relative to a radial line perpendicularly intersecting the clamping tracks, namely of an inner segment adjoining the inner leg and of an outer segment adjoining the outer leg. Especially favorable mechanical, in particular elastic, properties of the sliding disk can be achieved if each of the segments has a height, measured in the radial direction, of at least one third of the overall height of the sliding disk.

According to a first embodiment, the segments of the middle section of the sliding disk are each of rectilinear design per se in cross section. The angle enclosed between the segments is in this case at least 150°, for example 160°.

According to a second embodiment, the sliding disk in the middle section has a curved shape in cross section. In this case, the minimum radius of curvature of the middle section corresponds to at least half the overall height of the sliding disk.

Several exemplary embodiments of the invention are described in more detail below with reference to a drawing, in which:

DETAILED DESCRIPTION OF THE DRAWING

Figure 1:
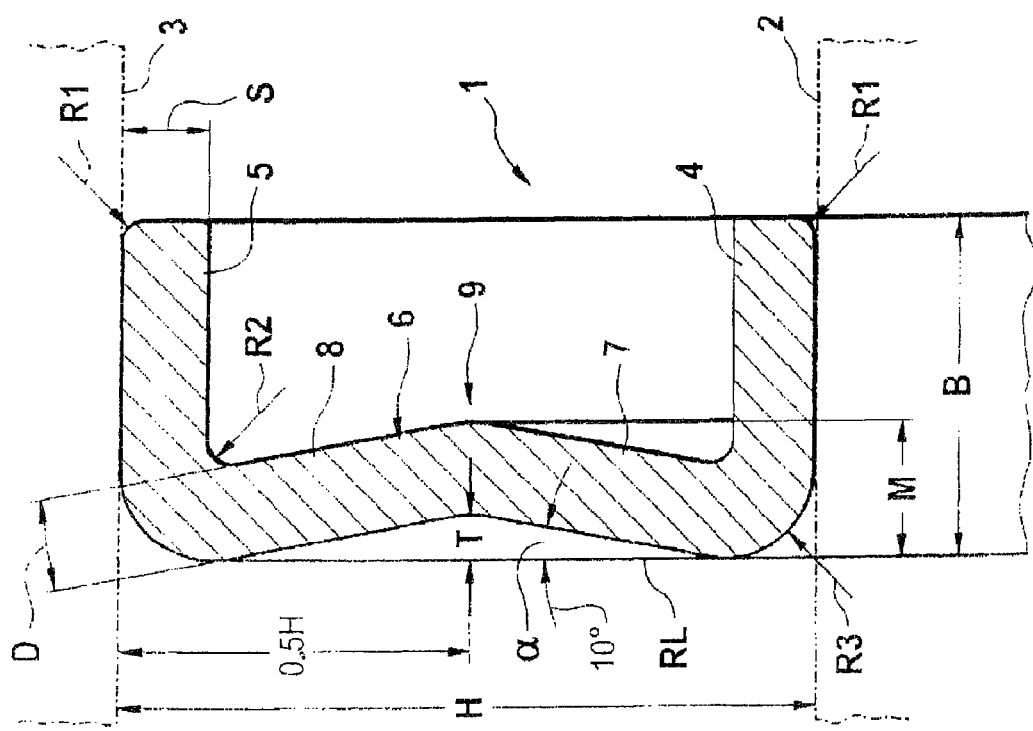
FIG. 1 shows in cross section a sliding disk of a freewheel clutch.

FIG. 1 shows a cross section of a sliding disk 1 which has a so-called "sigma profile". The sliding disk 1 is part of a clamping-body freewheel clutch (not shown in any more detail), the function of which is known in principle, for example, from U.S. Pat. No. 6,863,164 B2. Only an inner clamping track 2 and an outer clamping track 3 are indicated in FIG. 1. The overall height H of the sliding disk 1 corresponds essentially to the radial distance between the inner clamping track 2 and the outer clamping track 3. The extent of the sliding disk 1 measured in the axial direction is designated as overall width B. The sigma profile of the sliding disk 1 is composed of an inner leg 4 bearing against the inner clamping track 2, of an outer leg 5 bearing against the outer clamping track 3 and of a middle section 6 connecting the legs 4, 5 and bent in on itself. The shape of the middle section 6, bent in on itself and formed from two segments 7, 8, describes a bend 9 directed axially inward. In the arrangement according to FIG. 1, the axially inner side of the sliding disk 1 is located on the right-hand side of the middle section 6. As viewed from the outer side of the sliding disk 1 (on the left in FIG. 1), the bend 9 is shaped concavely. The bend 9 extends over the entire middle section 6 from the outer leg 5 up to the inner leg 4.

A radial line RL bearing against the outer side of the sliding disk 1 and running orthogonally to the clamping tracks 2, 3 touches the middle section 6 at two points, namely at the transitions to the inner leg 4 and to the outer leg 5, respectively. The maximum distance of the outer surface of the middle section 6 from this radial line RL is designated as maximum embossment depth T. The maximum embossment depth T relates to the mechanically unloaded state of the sliding disk 1. In the exemplary embodiment according to FIG. 1, the location of the maximum embossment depth T is situated centrally between the inner clamping track 2 and the outer clamping track 3. In this exemplary embodiment, the maximum embossment depth T is just under half the wall thickness D of the middle section 6. The segments 7, 8, which are each of rectilinear design per se, are inclined relative to the radial line RL in different directions by an angle α of 10°, such that the angle enclosed between the segments 7, 8 is 160°.

The axial extent of the middle section 6, which is about 1.5 times the wall thickness D, is designated by M and is about 40% of the overall width B of the sliding disk 1. The wall thickness D of the middle section 6 is somewhat larger than the wall thickness S of the legs 4, 5 of the sliding disk 1, which is produced as a sheet metal part formed without cutting. On their end face remote from the middle section 6, in the region in which they bear against the clamping tracks 2, 3, the legs 4, 5 are rounded off with a radius of curvature R1, which is between 2% and 5% of the overall height H. Within the same size range, a radius of curvature R2 lies on the inner side of the sliding disk 1 in the region of the transition between the leg 4, 5 and the middle section 6. On the outer side, opposite this region, of the sliding disk 1, a radius of curvature designated by R3 is 10% to 15% of the overall height H.

Figure 2:
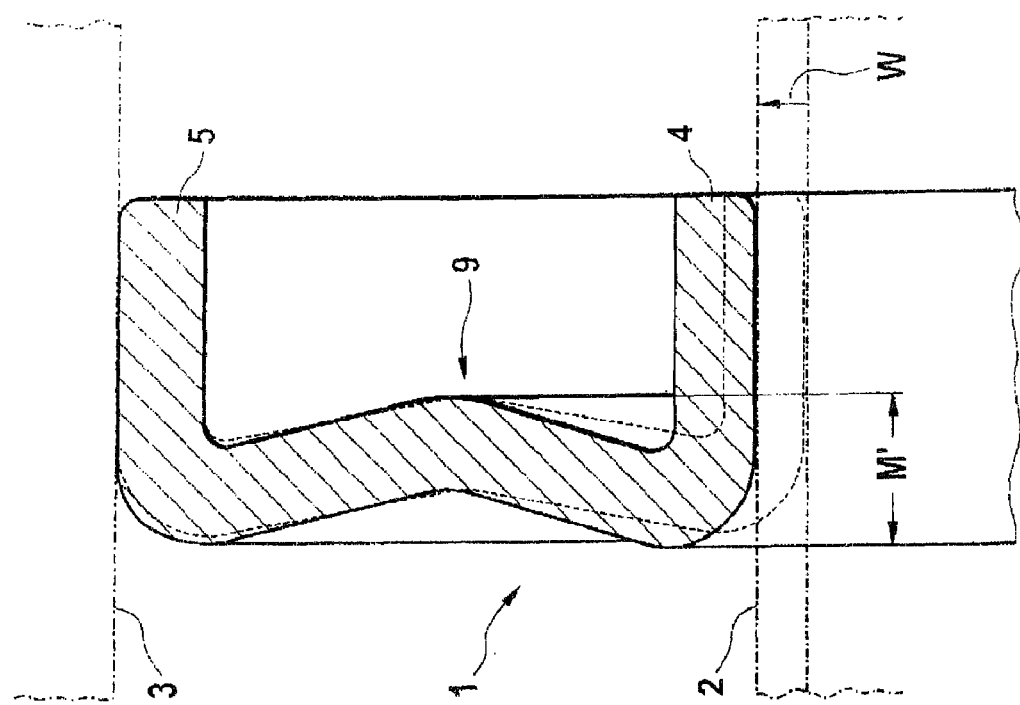
FIG. 2 shows the sliding disk according to FIG. 1 in the elastically deformed state.

FIG. 2 shows the sliding disk 1 in the mechanically loaded, elastically deformed shape, where, in contrast to the arrangement according to FIG. 1, the inner clamping track 2 is offset by a wall offset W in the direction of the outer clamping track 3. The contours of the inner clamping track 2 and of the sliding disk 1 in the mechanically unloaded state corresponding to the arrangement according to FIG. 1 are indicated by broken lines in FIG. 2. As can be seen from FIG. 2, the legs 4, 5, despite considerable deformation of the sliding disk 1, continue to bear virtually completely against the clamping tracks 2, 3. The axial extent M' of the mechanically loaded middle section 6 according to FIG. 2 is only about 10% greater than the axial extent M of the middle section 6 in the mechanically unloaded state. The elastic deformations of the sliding disk 1 do not lead to inadmissible loads on other components, in particular a cage (not shown in FIGS. 1 and 2) onto which a sliding disk 1 is slipped in each case at both end faces.

Figure 3:
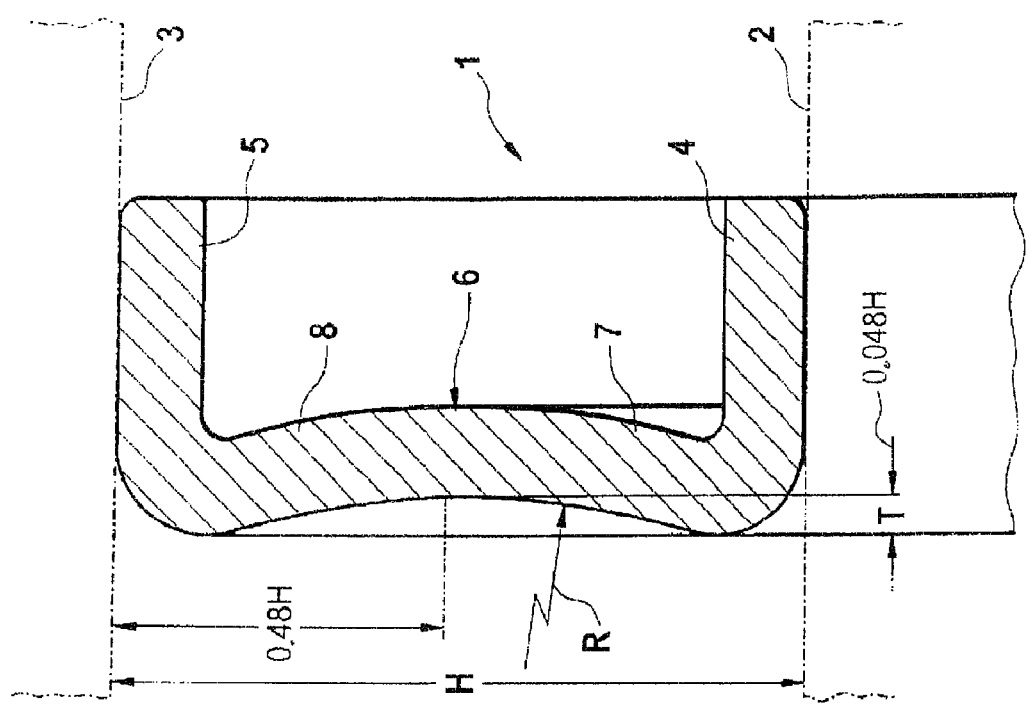
FIG. 3 shows a second exemplary embodiment of a sliding disk of a freewheel clutch.

The embodiment according to FIG. 3 differs from the embodiment according to FIGS. 1 and 2 essentially in the fact that the middle section 6 is of asymmetrical design. That segment 7 of the middle section 6 which adjoins the inner leg 4 extends over 57% of the overall height H of the sliding disk 1. The remaining 43% of the overall height H is taken up by that segment 8 of the middle section 6 which adjoins the outer leg 5. The last-mentioned segment 8 is inclined relative to the radial line RL by 10°, such that an angle enclosed between the segments 7, 8 of somewhat more than 160° is obtained.

Figure 4:
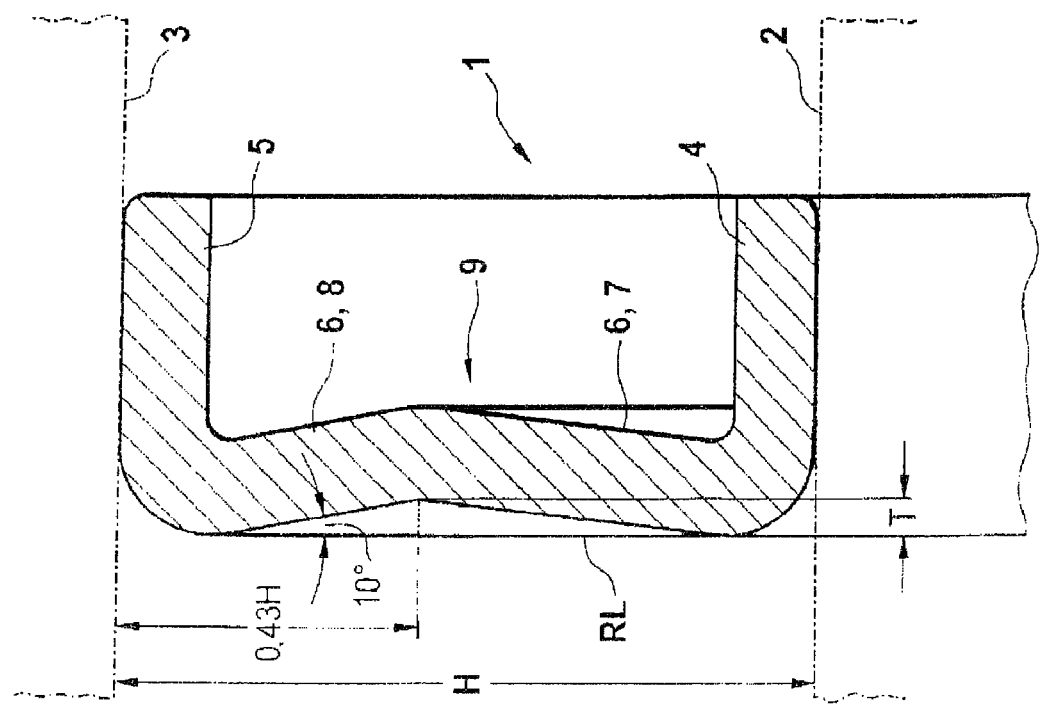
FIG. 4 shows a third exemplary embodiment of a sliding disk of a freewheel clutch.

In the embodiment according to FIG. 4, the middle section 6 is concavely curved overall, the radius of curvature R being greater than the overall height H of the sliding disk 1. The location of the maximum embossment depth T subdivides the overall height H of the sliding disk 1 in this case in the ratio of 48:52, the radius of curvature R decreasing, for instance, toward the outer leg 5. Deviating therefrom, a completely symmetrical form of the cross section of the curved middle section 6 is also possible.

Figure 5:
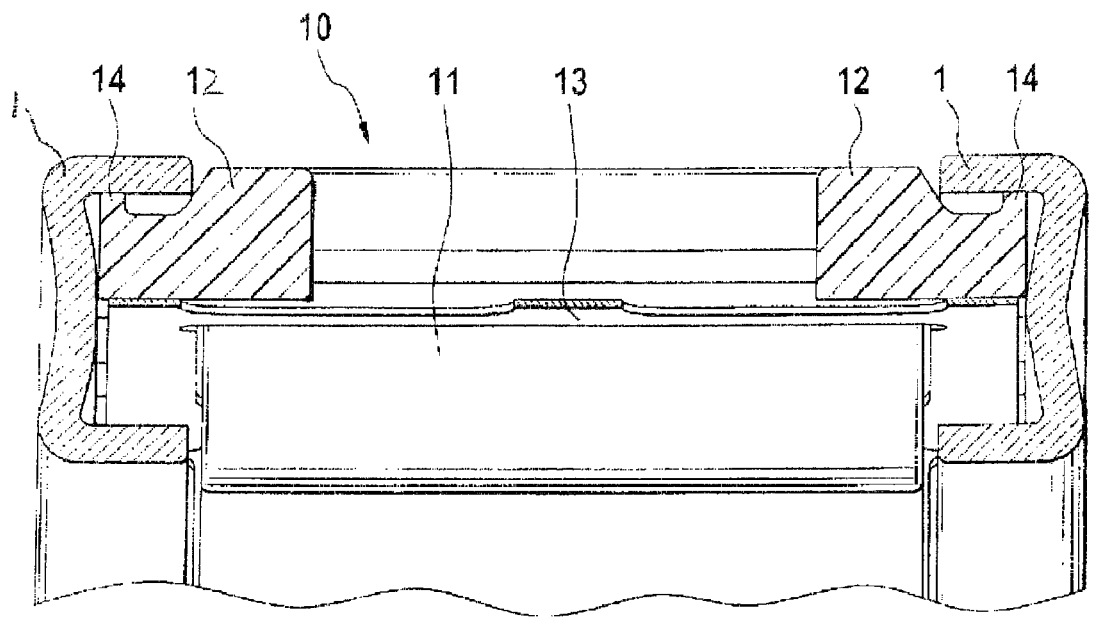
FIG. 5 shows a detail of a freewheel clutch having a sliding disk according to FIG. 1 and a sliding disk according to FIG. 4.
Figure 6:
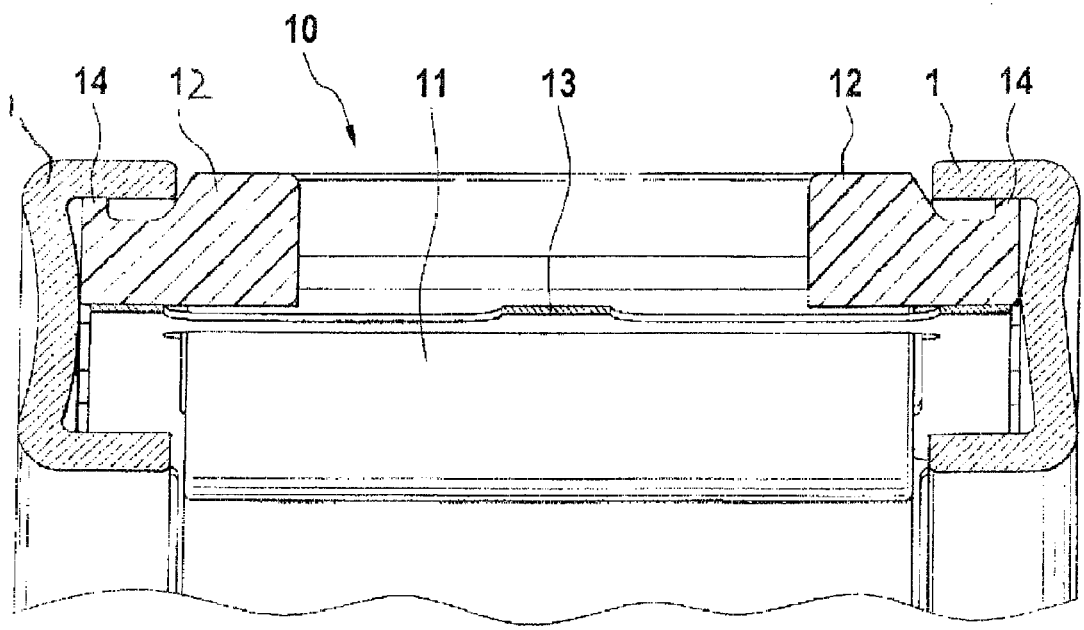
FIG. 6 shows in a view similar to FIG. 5 a freewheel clutch having a sliding disk according to FIG. 3 and a sliding disk according to FIG. 4.

FIGS. 5 and 6 show the fitting situation of sliding disks 1 according to the embodiments explained above. A freewheel clutch 10 can be seen in each Figure in a partly sectioned illustration, said freewheel clutch 10 having clamping bodies 11 which are guided in a cage 12. Furthermore, a spring strip 13 which serves for the spring contact of the clamping bodies 11 can be seen. The sliding disks 1 are snapped onto the end faces of the cage 12, which has a respective edge strip 14 there. The sliding disk 1 according to FIG. 4 is shown in each case in the left-hand half of FIG. 5 and FIG. 6. Shown in the right-hand half for comparison is the sliding disk 1 according to FIGS. 1 and 2 (FIG. 5) and the sliding disk 1 according to FIG. 3 (FIG. 6), respectively. Whereas sliding disks 1 having a bent profile of the middle section 6 (FIGS. 1 to 3) offer advantages from the production point of view, the sliding disk 1 having a middle section 6 arched continuously inward (FIG. 4) is distinguished by mechanical properties optimized once again.

List of Designations

1 Sliding disk
2 Inner clamping track
3 Outer clamping track
4 Inner leg
5 Outer leg
6 Middle section
7 Segment
8 Segment
9 Bend
10 Freewheel clutch
11 Clamping body
12 Cage
13 Spring strip
14 Edge strip
α Angle B Axial overall width
D Wall thickness
H Overall height
M, M' Axial extent of the middle section
R Radius of curvature
R1, R2, R3 Radius of curvature
RL Radial line
S Wall thickness
T Maximum embossment depth
W Wall offset

The invention claimed is:

1. A freewheel clutch, comprising:
    an inner clamping track;
    an outer clamping track, radially outside of the inner clamping track;
    clamping bodies arranged between the inner clamping track and the outer clamping track; and
    two sliding disks between the inner clamping track and the outer clamping track, each of the two sliding disks having an inner leg bearing radially inward against the inner clamping track, an outer leg bearing radially outward against the outer clamping track, and a middle section connecting the inner leg and the outer leg, the middle section having two circumferentially continuous segments, an inner segment which adjoins the inner leg and an outer segment which adjoins the outer leg, the inner segment and the outer segment both extending at an angle radially toward each other and joining to form a bend, the bend extends axially inwardly between the outer leg and the inner leg, and wherein a maximum inclination of the middle section relative to a radial line running orthogonally to the clamping tracks is not more than 30°.

2. The freewheel clutch as claimed in claim 1, wherein the bend has an embossment depth which is less than a wall thickness of the middle section.

3. The freewheel clutch as claimed in claim 2, wherein the middle section is bent axially inward with an embossment depth of not more than half the wall thickness.

4. The freewheel clutch as claimed in claim 1, wherein the middle section has an axial extent which is less than half an axial overall width of the sliding disk.

5. The freewheel clutch as claimed in claim 1, wherein the inner segment and the outer segment each have a height, measured radially, of at least ⅓ of an overall height of the sliding disk.

6. The freewheel clutch as claimed in claim 5, wherein the segments of the middle section are rectilinear as viewed in cross-section.

7. The freewheel clutch as claimed in claim 6, wherein the angle enclosed between the segments is at least 150°.

8. The freewheel clutch as claimed in claim 5, wherein the segments of the middle section are curved as viewed in cross-section.

9. The freewheel clutch as claimed in claim 8, wherein a minimum radius of curvature of the segments corresponds to at least half the overall height of the sliding disk.

* * * * *